W. H. GARLOCK.
BREAD SLICING MACHINE.
APPLICATION FILED APR. 2, 1919.

1,307,397.

Patented June 24, 1919.
2 SHEETS—SHEET 1.

Witness

Inventor
W. H. Garlock
By Lester L. Sargent
Attorney

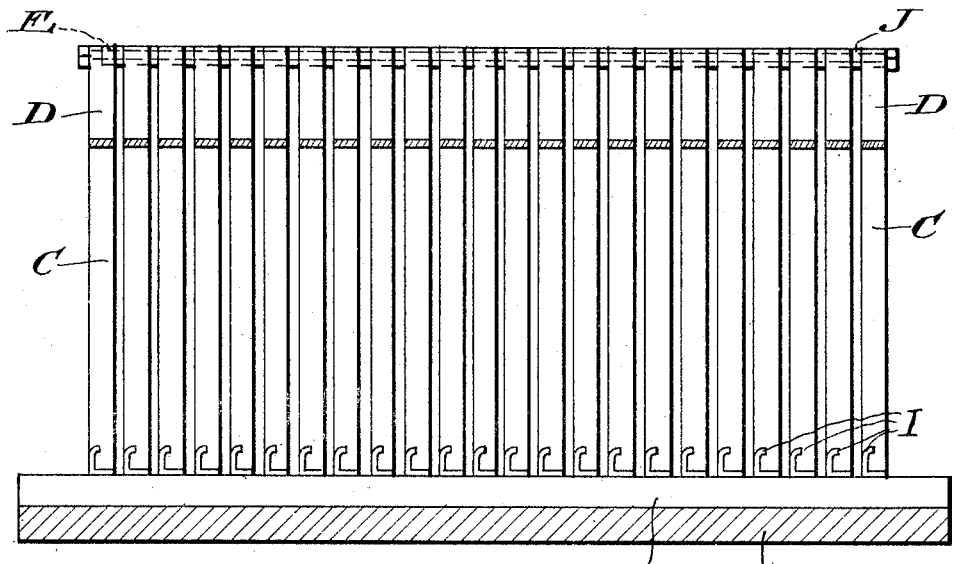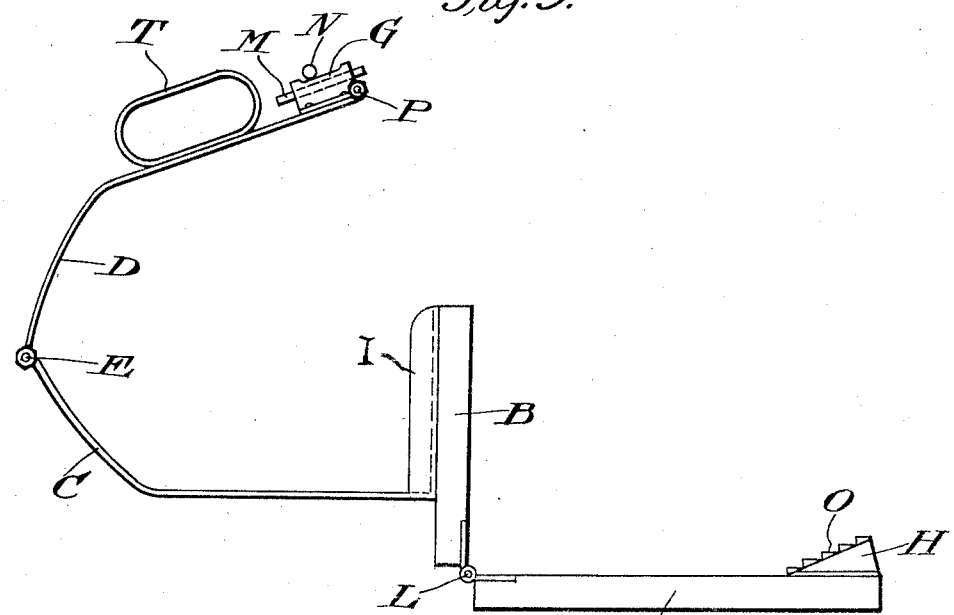

UNITED STATES PATENT OFFICE.

WILLIAM H. GARLOCK, OF SEATTLE, WASHINGTON.

BREAD-SLICING MACHINE.

1,307,397.   Specification of Letters Patent.   Patented June 24, 1919.

Application filed April 2, 1919.   Serial No. 286,978.

*To all whom it may concern:*

Be it known that I, WILLIAM H. GARLOCK, a citizen of the United States, residing at Seattle, in the county of King and State of Washington, have invented a new and useful Bread-Slicing Machine, of which the following is a specification.

The object of my invention is to provide an improved device for guiding a knife in the operation of slicing bread or other food stuff in slices of regular thicknesses and uniformity. I attain these and other objects of my invention by the mechanism illustrated in the accompanying drawings, in which—

Fig. 3 is a vertical section on line 3—3 of Fig. 2; and

Fig. 4 is an end elevation with the bread holding frame in open position.

Like numerals designate like parts in each of the several views.

Referring to the accompanying drawings, I provide a base board A to which is pivotally attached a second board B by means of hinges L. Attached to the board or leaf B, I provide a series of ribs C and D, shaped to engage over a loaf of bread and having the ends of said ribs shaped at their upper ends to engage the shaft E, and permitting of a pivotal movement of the ribs relative to the aforesaid shaft E, the range of said movement however being small. The foot of each of the ribs C is formed with an upward and curved shaped member I, curved to clear the cutting knife and raised to clear the leaf B so as to form a clean cut.

Attached to the lower end of one of the ribs B (preferably the central rib), I provide a suitable foot G carrying a vertically slidable pin M, which is operated by a knob N and is adapted to engage one of the ratchet members O of a block H. The block H is secured in any suitable manner to the base board A, its attachment however being rigid. I further provide a suitable handle T attached to one of the ribs D for raising or lowering the bread slicing frame. The lower ends of the ribs B are shaped to rigidly engage a suitable shaft P.

Figure 1:
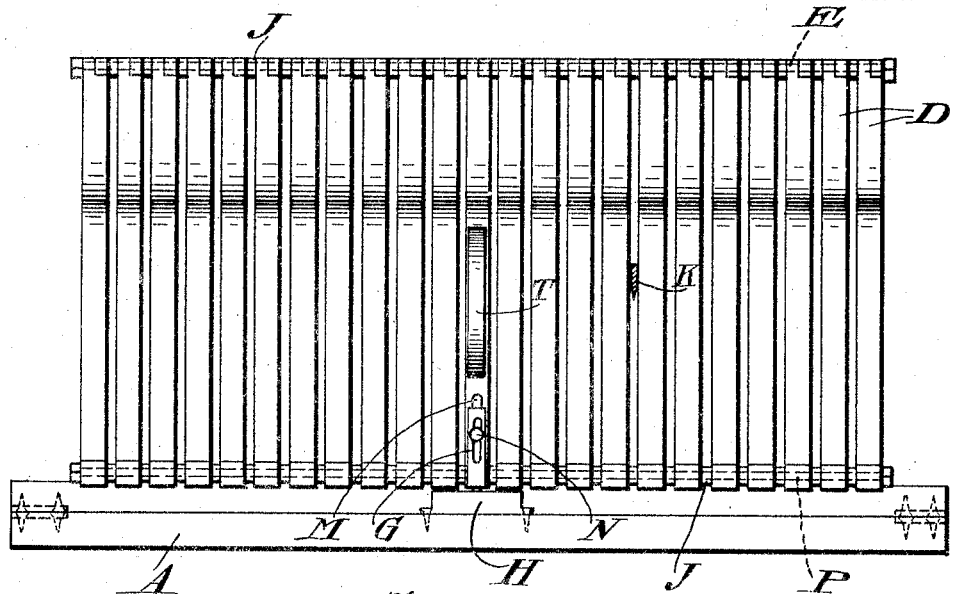
Figure 1 is a side elevation of the invention.
Figure 2:
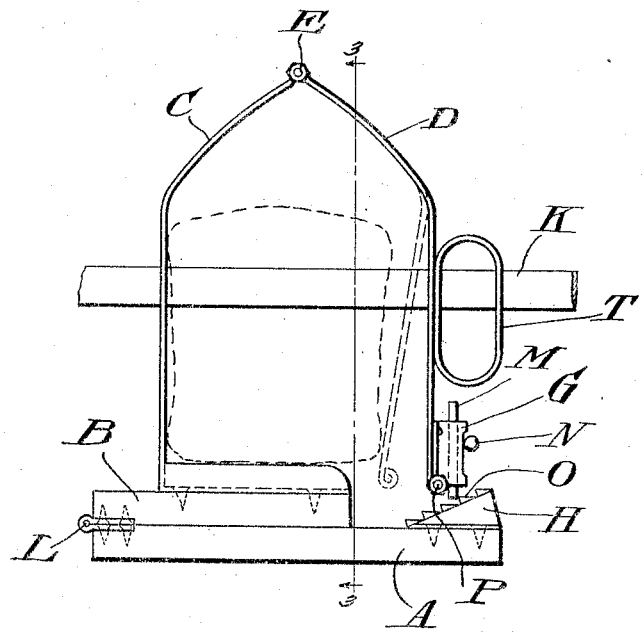
Fig. 2 is an end elevation of the machine.

The ribs C and D are spaced apart from their adjacent ribs by suitable rings or washers J on the shaft E, of the proper thickness to allow a knife K to pass freely between the ribs, as illustrated in Figs. 1 and 2. Similar washers J, on shaft P similarly separate or space the lower ends of the ribs D from each other.

The bread slicing frame is raised and lowered by means of the handle T, and is secured in working position by the pin M and ratchet or rack O which it engages.

The arched form of the upper portions of the ribs C and D causes them to extend above the loaf ample distance for the convenient insertion of the knife K between adjacent ribs of the bread slicing frame, making it possible to conveniently cut the loaf into successive slices of identical thickness, and to perform the operation rapidly.

What I claim is:

1. In a bread slicing machine, the combination of a baseboard, a leaf pivotally connected to and resting on the baseboard, a series of spaced knife-guiding ribs attached to the leaf, a shaft engaged by the upper ends of the ribs, spacing members between the ribs, corresponding opposed ribs pivotally connected to the shaft, and means for locking the series of ribs to the baseboard adjustably.

2. In a bread slicing machine, the combination of a baseboard, a leaf pivotally connected to and resting on the baseboard, a series of spaced knife-guiding ribs attached to the said leaf, a shaft engaged by the upper ends of the ribs, opposed ribs attached to the shaft, spacing members between the ribs, means for adjustably securing the ribs to the baseboard, and a shaft engaged by the lower ends of the opposed ribs.

3. In a bread slicing machine, the combination of a base member, a bread slicing frame attached to the base member, said frame consisting of a series of closely spaced ribs, the ribs being arched at their upper ends, a shaft to which the ribs are attached, opposed corresponding arched ribs pivotally connected to the shaft, spacing members between the ribs, and means for securing the above-described frame in working position to the baseboard and over the loaf to be sliced.

4. In a bread slicing machine, the combination of a base board, a second board pivotally connected to the baseboard, a series of ribs attached to the second board in spaced relation, shafts to which the ribs are attached, spacing members between the ribs, a ratchet element affixed to the baseboard, and an adjustable fastening element carried by one of the ribs and adapted to engage the ratchet element to lock the device over a loaf.

5. In a bread slicing machine, the combination of a baseboard, a leaf attached to the baseboard, a series of frames curved upwardly at the top, a shaft engaged by the curved portions of said frames, the frames having angular shaped feet attached to the baseboard, the upper portions of said angular feet being curved to clear the cutting knife, the lower of said feet being rigidly connected to the leaf, a rack on the baseboard, and a keeper carried by the frames and adapted to engage the rack.

WILLIAM H. GARLOCK.

Copies of this patent may be obtained for five cents each, by addressing the "Commissioner of Patents, Washington, D. C."